US009058365B2

(12) United States Patent
Baumgaertel et al.

(10) Patent No.: US 9,058,365 B2
(45) Date of Patent: Jun. 16, 2015

(54) SYSTEMS AND METHODS PROVIDING TOUCHSCREEN REPORT NAVIGATION

(75) Inventors: Dirk Baumgaertel, Hockenheim (DE); Karl-Peter Nos, Nussloch (DE)

(73) Assignee: SAP SE, Walldorf (DE)

( * ) Notice: Subject to any disclaimer, the term of this patent is extended or adjusted under 35 U.S.C. 154(b) by 286 days.

(21) Appl. No.: 12/975,734

(22) Filed: Dec. 22, 2010

(65) Prior Publication Data

US 2012/0166470 A1    Jun. 28, 2012

(51) Int. Cl.
*G06F 7/00* (2006.01)
*G06F 17/30* (2006.01)
*G06Q 10/06* (2012.01)
*G06Q 10/10* (2012.01)

(52) U.S. Cl.
CPC .... *G06F 17/30554* (2013.01); *G06F 17/30592* (2013.01); *G06Q 10/067* (2013.01); *G06Q 10/10* (2013.01)

(58) Field of Classification Search
USPC ................................... 707/705, 737
See application file for complete search history.

(56) References Cited

U.S. PATENT DOCUMENTS

| | | | |
|---|---|---|---|
| 6,504,571 B1 * | 1/2003 | Narayanaswami et al. | 348/231.99 |
| 7,738,032 B2 * | 6/2010 | Kollias et al. | 348/370 |
| 8,065,156 B2 * | 11/2011 | Gazdzinski | 704/275 |
| 2004/0117358 A1 * | 6/2004 | von Kaenel et al. | 707/3 |
| 2008/0196108 A1 * | 8/2008 | Dent et al. | 726/28 |
| 2009/0083340 A1 * | 3/2009 | Baskaran et al. | 707/203 |
| 2009/0172035 A1 * | 7/2009 | Lessing et al. | 707/104.1 |
| 2009/0182748 A1 * | 7/2009 | Walker | 707/10 |
| 2009/0182749 A1 * | 7/2009 | Walker | 707/10 |
| 2009/0265650 A1 * | 10/2009 | Canovai | 715/769 |
| 2010/0082232 A1 * | 4/2010 | Lee | 701/201 |
| 2010/0094871 A1 * | 4/2010 | Ruggieri et al. | 707/737 |
| 2010/0268463 A1 * | 10/2010 | Kurtti et al. | 701/213 |
| 2012/0072460 A1 * | 3/2012 | Friedlander et al. | 707/784 |

* cited by examiner

*Primary Examiner* — Hosain Alam
*Assistant Examiner* — Eliyah S Harper
(74) *Attorney, Agent, or Firm* — Buckley, Maschoff & Talwalkar LLC

(57) ABSTRACT

According to some embodiments, a database may store business information and meta-data associated with the business information. A processor coupled to the database may generate: (i) a first report associated with at least some of the business information, wherein the first report is to be displayed in a first area of a display of a remote touch sensitive device, and (ii) a second report associated with at least some of the business information, wherein the second report is to be displayed in a second area of the touch sensitive device. A communication port coupled to the processor may transmit the first and second reports and receive a destination location from the touch sensitive device, wherein the destination location is associated with a movement of a selected report element of the first report. According to some embodiments, the processor may, if the destination location is not associated with a report, generate a third report based on at least some of the business information and the selected report element. If the destination location is associated with the second report, the processor may generate a modified second report based on a pre-determined analytical mapping between the first and second reports, if available.

18 Claims, 12 Drawing Sheets

SYSTEMS AND METHODS PROVIDING TOUCHSCREEN REPORT NAVIGATION

TECHNICAL FIELD

The present disclosure relates to methods, software, and devices for performing analytical procedures, and, more specifically, to methods, software, and devices providing touchscreen report navigation for business information.

BACKGROUND

Analytical applications generally show content, such as business information including sales, inventory, and other relevant data, as charts and/or tables representing underlying datasets. In some instances, subsets of a large, underlying set of data can be generated such that specific characteristics or filtered criteria of a larger dataset are represented instead. Within an analytical application, the reports (e.g., charts and tables) used to express various types or sets of data can be multiple in type, form, and criteria, based on user requests, predetermined sets of information generally known to be useful to a set of users, and sets of related data. Further, different types of reports may be used, including spreadsheets, pie charts, line graphs, bar charts, and any other suitable means for illustrating datasets or defined subsets thereof.

Touchscreen and multi-touch devices provide methods for entering information through the use of a pointer, finger, or other touch-based device or tool, as well as through previous tools, such as a standard mouse or hardware-based keyboard. Multi-touch devices, specifically, provide users with the ability to apply multiple finger gestures simultaneously onto a visual display, such as a graphical user interface on a touchscreen, to send complex commands to the device. The use of touch inputs with analytical data provides immersive, interactive, and intuitive methods and procedures for selecting, manipulating, and navigating reports.

In some cases, a user may want to perform an action with respect to a selected portion of a report, such as by dragging the selected portion and dropping it to another area of the touchscreen display (e.g., as he or she navigates among multiple reports). Note, however, that such an action may be performed in various contexts (e.g., depending on where he or she dropped the selected portion of the report) which may influence how the action should be interpreted. Accordingly, it may be desirable to provide systems and methods that facilitate an intuitive interface in connection with touchscreen report navigation.

DETAILED DESCRIPTION

Figure 1:
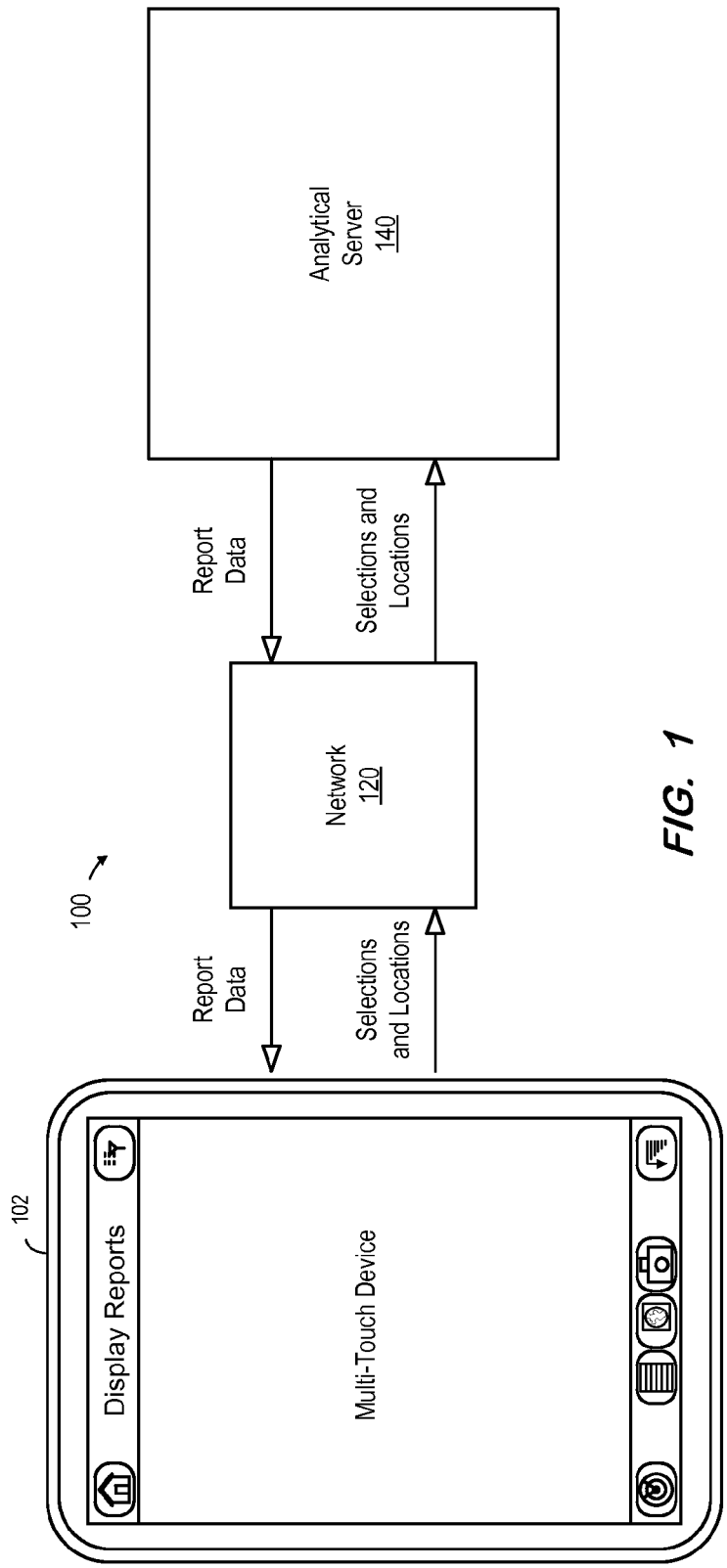
FIG. 1 is a block diagram of a system according to some embodiments.

The following description is provided to enable any person in the art to make and use the described embodiments and sets forth the best mode contemplated for carrying out some embodiments. Various modifications, however, will remain readily apparent to those in the art.

Some embodiments described herein are associated with methods, devices, and systems for visualizing sets of analytical data reports, and, through procedures and methods of interacting with those reports (or graphical objects representing a particular dataset), creating new visual representations of data based on those interactions. In general, a dataset or report may refer to the result of a data extraction from a system containing information, through the generation of an analytical report, or, more generally, the results of a database query. Datasets can be represented in a number of ways, including a graphical visualization of the dataset (e.g., a chart, graph, or other illustration of the data) or in a table-based display. These visual representations can represent an entire dataset, or in some cases, a portion of the dataset filtered by categories, types, or organizations of the information. Visualizations of portions of the underlying dataset can be used to provide more structured, meaningful, and detailed data, particularly for users interested in the information from a certain point of view or for a certain task. For example, an entire set of sales information for a company can be processed to show only certain or specific criteria, such as visualizations of sales for a specific region, a specific store, a subset of offered products, as well as any other discrete method of splitting or classifying the overall dataset. In some instances, subsets of the overall dataset may be considered to be filtered subsets of the overall dataset.

Within a particular visual representation of a dataset, users can select an entire report (such as a whole chart, graph, or table) or a subset of the report (such as individual bars of a bar chart, pieces of a pie chart, rows or cells within a table, as well as other discrete portions or combinations of the dataset). These selections thus represent a subset of one or more criteria for the selected portion of the dataset. For example, in a sales order bar graph, illustrating sales (combination of actual, projected, and targets) on the y-axis, and dates (by month) on the x-axis, the selection of three vertical bars in the bar graph might represent the sales for a three-month period. Therefore, the criteria associated with the selected subset represents the sales information for those three months. Similarly, in a table illustrating total sales value for several regions (e.g., Europe, United States, and Asia), with the values also delineated by years (e.g., 2009 sales and 2010 sales), the selection of a line associated with US sales in 2009 represents the selected criteria of total sales in the US region in 2009 from the report. In other words, each selection of a subset of data from the dataset's visual representation contains a semantic meaning with regard to the underlying data. These semantics, through the use of the visual representation of the subset, can then be applied to other datasets, in turn applying similar filters or criteria to other related datasets. By doing so, additional criteria and refinements can be applied to related datasets, allowing users to quickly and easily manipulate data to conform or relate to the criteria defined in the original visual representation. Still further, through the use of touchscreen and multi-touch systems, the visual representations of various reports can be manipulated in an interactive manner to provide users with high levels of usability and semantic understanding as real-time selections, modifications, and/or navigations are made in connection with one or more reports.

FIG. 1 is a block diagram of a system 100 that may support real-time selections, modifications, and/or navigations for one or more reports according to some embodiments. In particular, the system 100 includes a multi-touch device 102 that may receive report data from an analytical server 140 via network 120. The analytical server 140 might be associated with, for example, an Advanced Business Application Programming back-end server and/or a ByDesign® business information application provided by SAP AG. Moreover, the analytical server 140 may include a database storing business information, pre-determined analytical mappings, and/or meta-data. The report data may be used to display one or more reports to a user of the multi-touch device 102.

Figure 2:
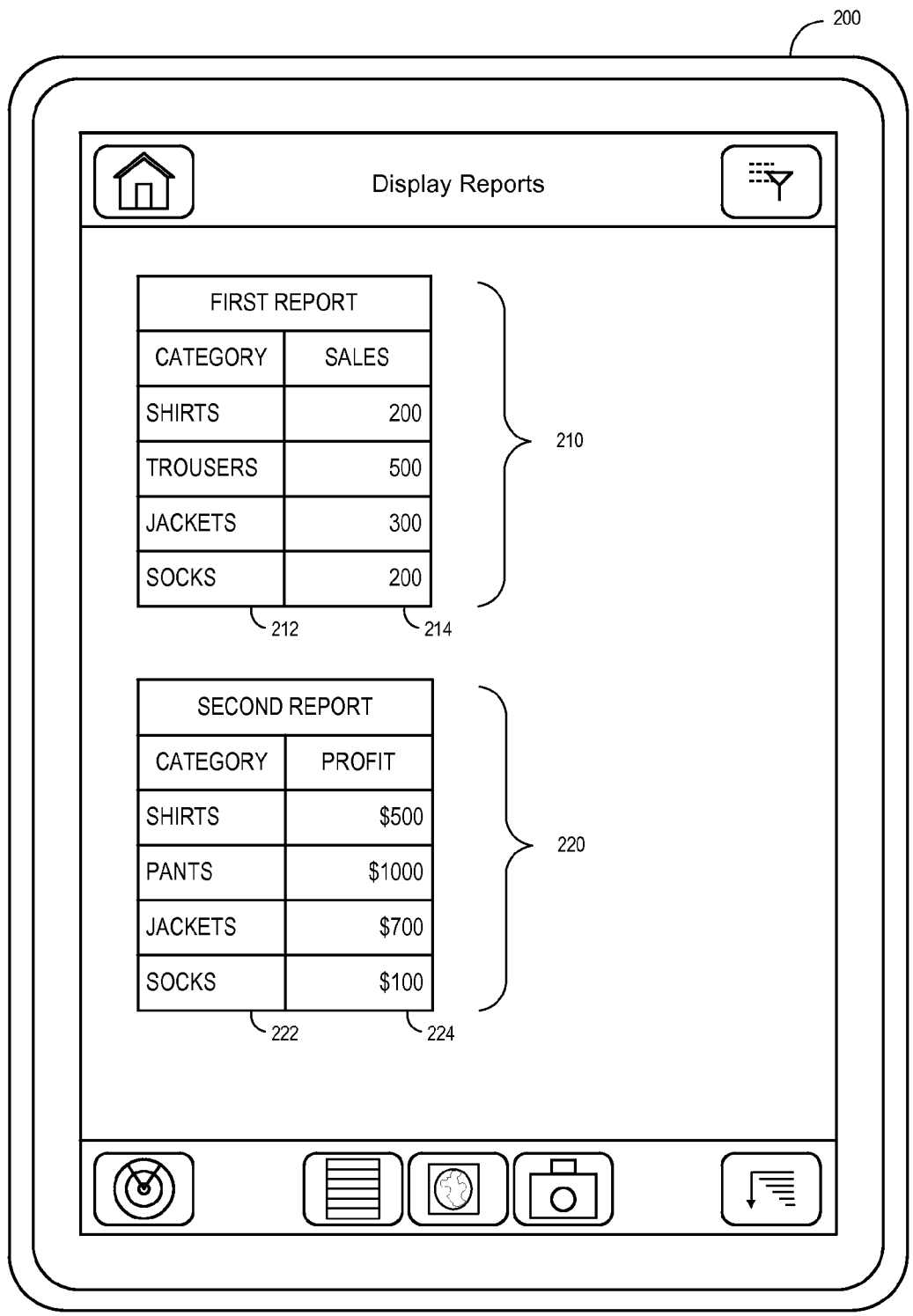
FIG. 2 is an illustration of a touchscreen display in accordance with some embodiments.

For example, FIG. 2 is an illustration of a touchscreen display 200 in accordance with some embodiments. The display 200 includes a first report 210 having a first column 212 indicating a product category and a second column 214 indicating sales for that product category. In the example of FIG. 2, the first report 210 indicates that 300 jackets were sold (e.g., during a particular period of time). Similarly, the display 200 includes a second report 220 having a first column 222 indicating a product category and a second column 224 indicating profit for that product category. In the example of FIG. 2, the second report 220 indicates that socks are associated with $100 profit (e.g., during a particular period of time).

In some cases, a user may want to perform an action with respect to a selected portion of a report, such as by dragging the selected portion and dropping it to another area of the touchscreen display (e.g., as he or she navigates among multiple reports). That may result, for example, in the multi-touch device 102 transmitting selection and/or location data (e.g., an X and Y coordinate representing a location of a user's finger on the touchscreen) to the analytical server 140 via the network 120. Note, however, that such an action may be performed in various contexts (e.g., depending on where he or she dropped the selected portion of the report) which may influence how the action should be interpreted. Accordingly, it may be desirable to provide systems and methods that facilitate an intuitive interface in connection with touchscreen report navigation.

Figure 3:
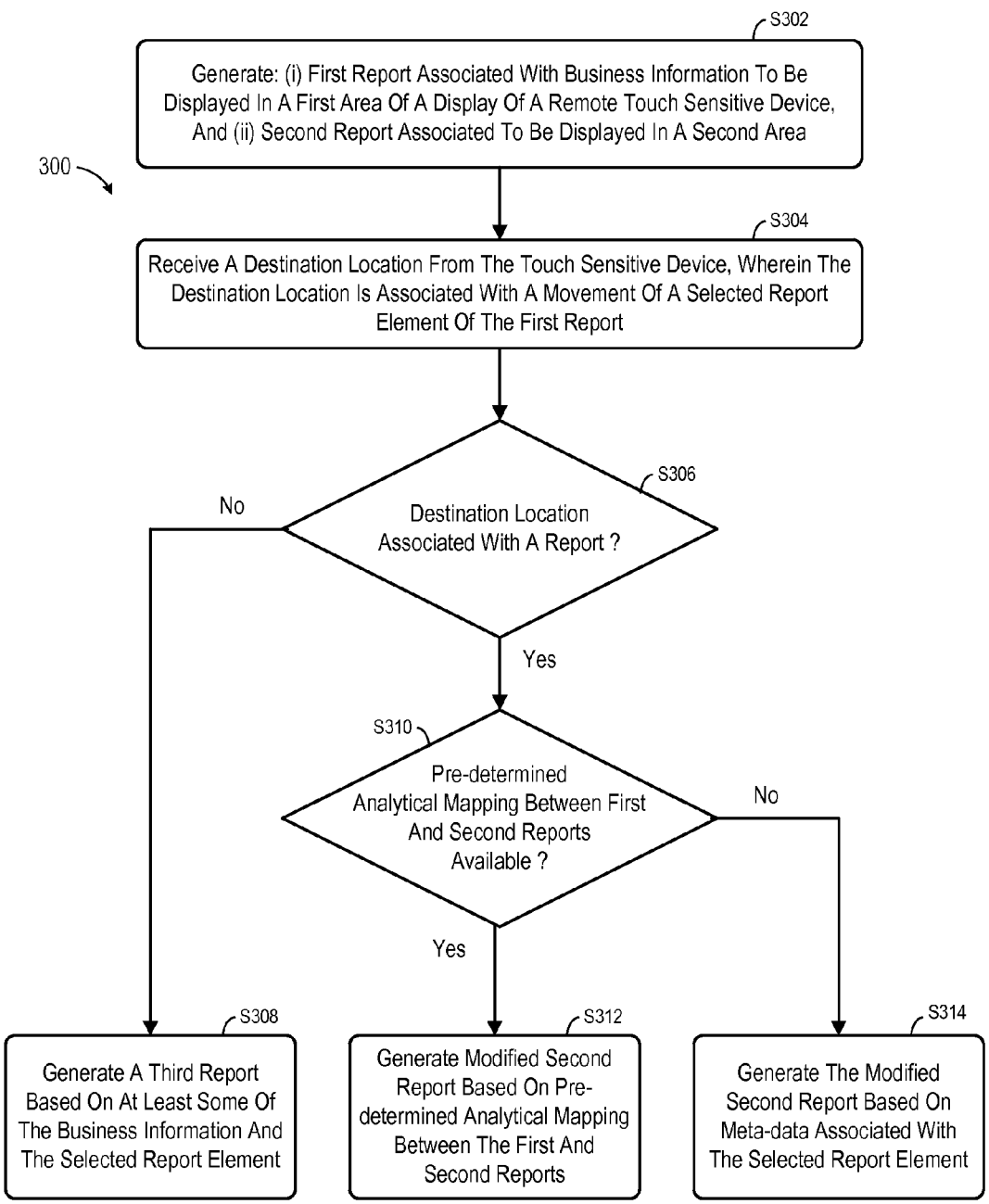
FIG. 3 is a flow chart of a process that may be performed by an analytical server according to some embodiments.

FIG. 3 is a flow chart of a process 300 that may be performed by, for example, the analytical server 140 of FIG. 1 according to some embodiments. The flow charts described herein do not necessarily imply a fixed order to the actions, and embodiments may be performed in any order that is practicable. Note that any of the methods described herein may be performed by hardware, software (including low level language code), firmware, or any combination of these approaches. For example, a storage medium may store thereon instructions that when executed by a machine result in performance according to any of the embodiments described herein.

At S302, the analytical server may generate a first report associated with at least some business information in a database, wherein the first report is to be displayed in a first area of a display of a remote touch sensitive device. The analytical server may also generate a second report associated with at least some of the business information, wherein the second report is to be displayed in a second area of the touch sensitive device. By way of example, the display 200 of FIG. 2 includes two reports 210, 220 in different areas. Note that a report could include a table containing business information and/or a graphical representation of business information.

Figure 4:
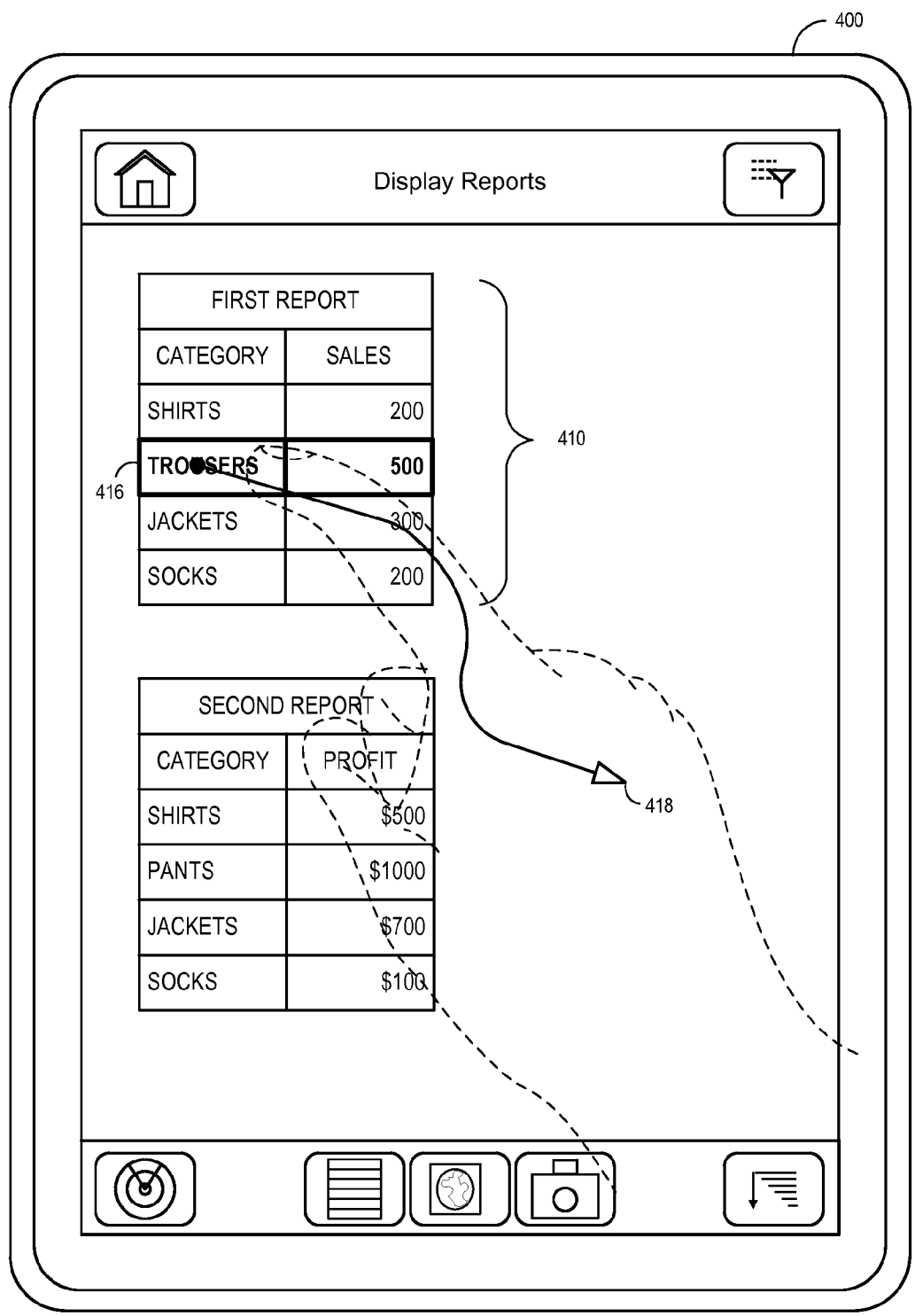
FIG. 4 is an illustration of a touchscreen display including a selected element of a first report in accordance with some embodiments.

At S304, the analytical server may receive a destination location from the touch sensitive device. The destination location may, for example, be associated with a movement of a selected report element of the first report. The destination location might be, for example, associated with a drag and drop operation of the touch sensitive device. Consider the display 400 of FIG. 4 where a user has selected an element 416 of a first report 410 (e.g., as illustrated by bold in FIG. 4). In this case, the user might touch the selected element 416, "drag" it to another area 418 of the display 400, and drop it by removing his or her finger. In this case, the destination location transmitted from the touchscreen device to the analytic server might represent an X and Y coordinate of the drop area 418. Note that the destination location may be associated with the movement of a single report element or multiple report elements and/or multiple reports. For example, a user might drag and drop a single row from a report, multiple rows from a report, or multiple rows from several different reports.

Figure 5:
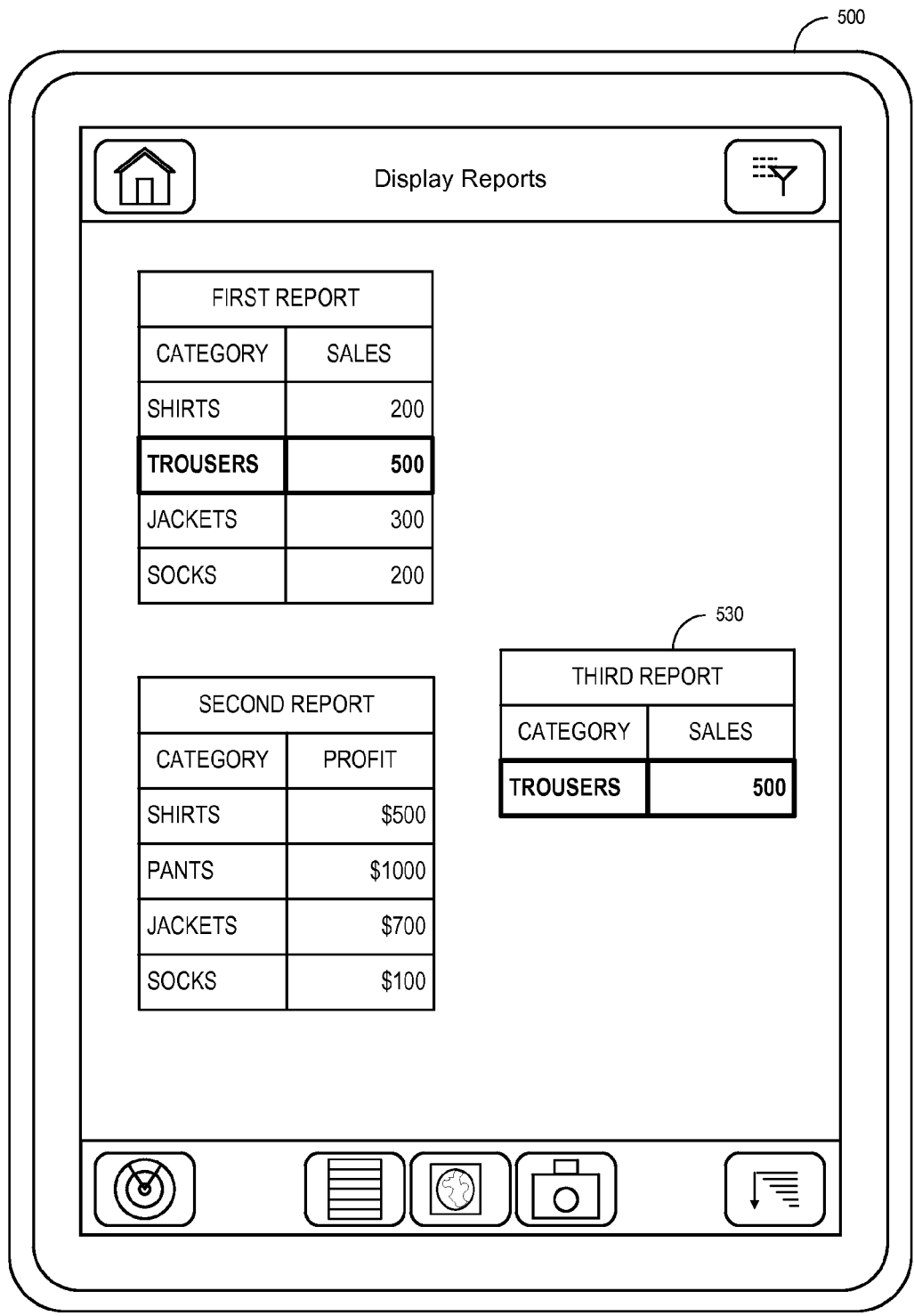
FIG. 5 is an illustration of a display after the action of FIG. 4 has been performed according to some embodiments.

At S306, it may be determined if the destination location is associated with a report. That is, it may be determined whether or not the destination location is co-located with another report. If the destination location is not associated with a report at S306, the analytic server may generate a third report based on at least some of the business information and the selected report element at S308. Consider again the example of FIG. 4, where the destination location, or drop area 418, was not associated with another report (e.g., he or she dropped the selected element 416 in an empty portion of the display 400). FIG. 5 is an illustration of a display 500 after the action of FIG. 4 has been performed according to some embodiments. As can be seen, the display includes a third report 530 (representing the selected element 416 of FIG. 4 created at the drop area 418). According to some embodiments, the third report 530 comprises a new instance of the first report. Note that the third report includes sales information for only the elements that had been selected in the first report ("trousers").

Figure 6:
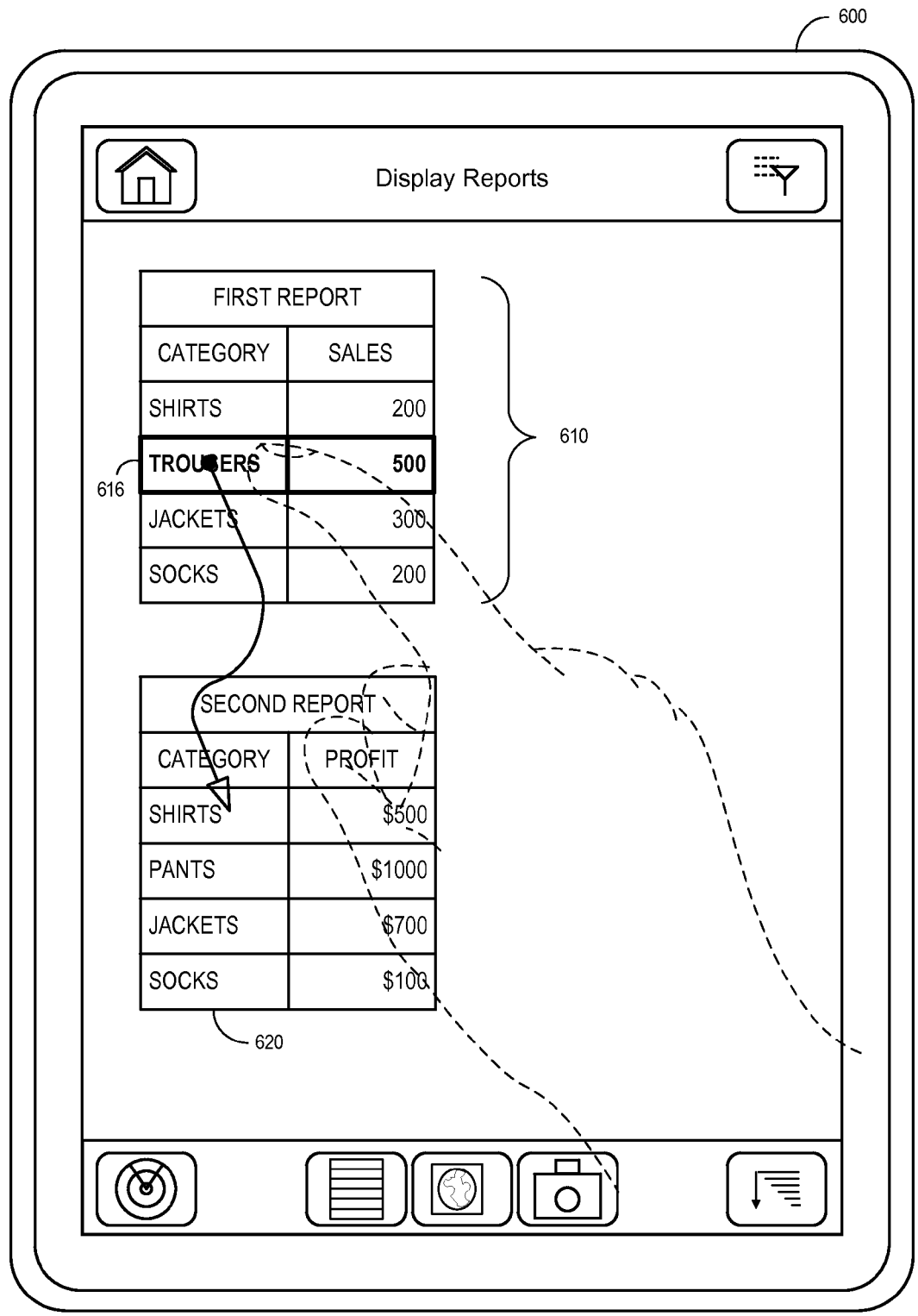
FIG. 6 is an illustration of a touchscreen display including a selected element of a first report in accordance with another embodiment.

In some cases, it may be determined at S306 that the destination location is in fact associated with another report. Consider, for example, the display 600 of FIG. 6 where a user has selected an element 616 of a first report 610 (e.g., as illustrated by bold in FIG. 4). In this case, the user might touch the selected element 616, "drag" it to another area of the display 400 co-located with a second report 620, and drop it by removing his or her finger. In this case, the destination location transmitted from the touchscreen device to the analytic server might represent an X and Y coordinate co-located with the second report 620.

Figure 7:
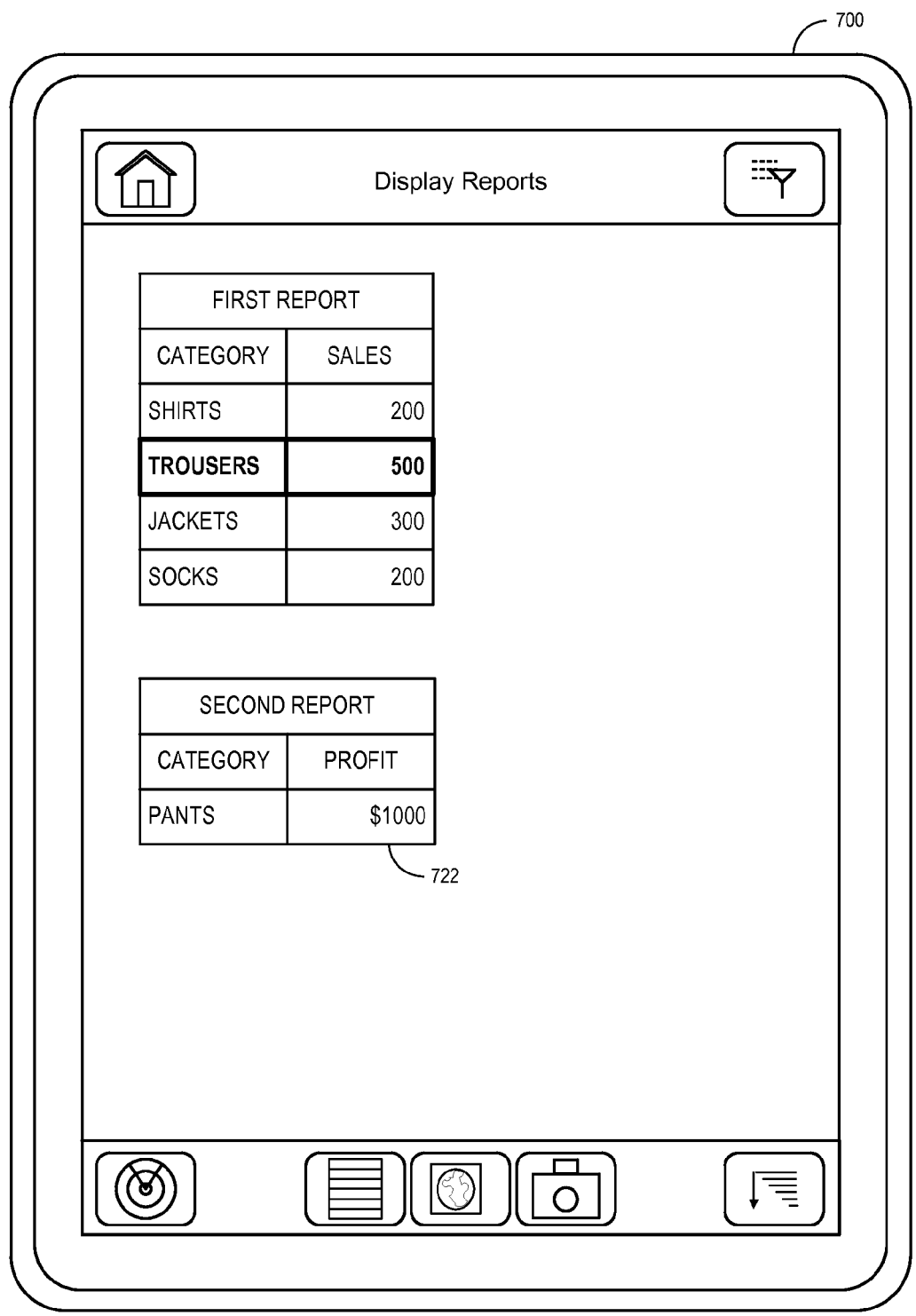
FIG. 7 is an illustration of a display after the action of FIG. 6 has been performed according to some embodiments.

When it is determined at S306 that the destination location is associated with another report, the analytic server might check to see if a pre-determined analytical mapping between the first and second reports is available at S310. If so, a modified second report may be generated based on the pre-determined analytical mapping between the first and second reports. For example, FIG. 7 is an illustration of a display 700 after the action of FIG. 6 has been performed according to some embodiments. In this case, because only "trousers" were included as the selected element 616 that was dropped onto the second report 620, a modified second report 722 has been generated that includes profit information for "pants." That is, the analytic server found a pre-determined analytical mapping between the "trousers" of the first report and the "pants" of the second report (e.g., a navigation from a source report to a target report). That mapping was then used to create the modified second report. According to some embodiments, one or more filtering parameters associated with the first report are also automatically applied to the third report (e.g., a period of time or geographic location filtering parameter).

If no pre-determining analytical mapping is available between the first and second reports at 5310, the modified second report may be generated based on meta-data associated with the selected report element at 5314. That is, if no pre-determined analytical mappings had been found in the example of FIG. 7, the analytical server may have used meta-data associated with "trousers" or "pants" to determine how to modify the second report 722 as appropriate. The meta-data used to generate the modified second report 722 might be associated with, for example, a Business Object ("BO") or Multi-Dimensional Analytic View ("MDAV") information.

Figure 8:
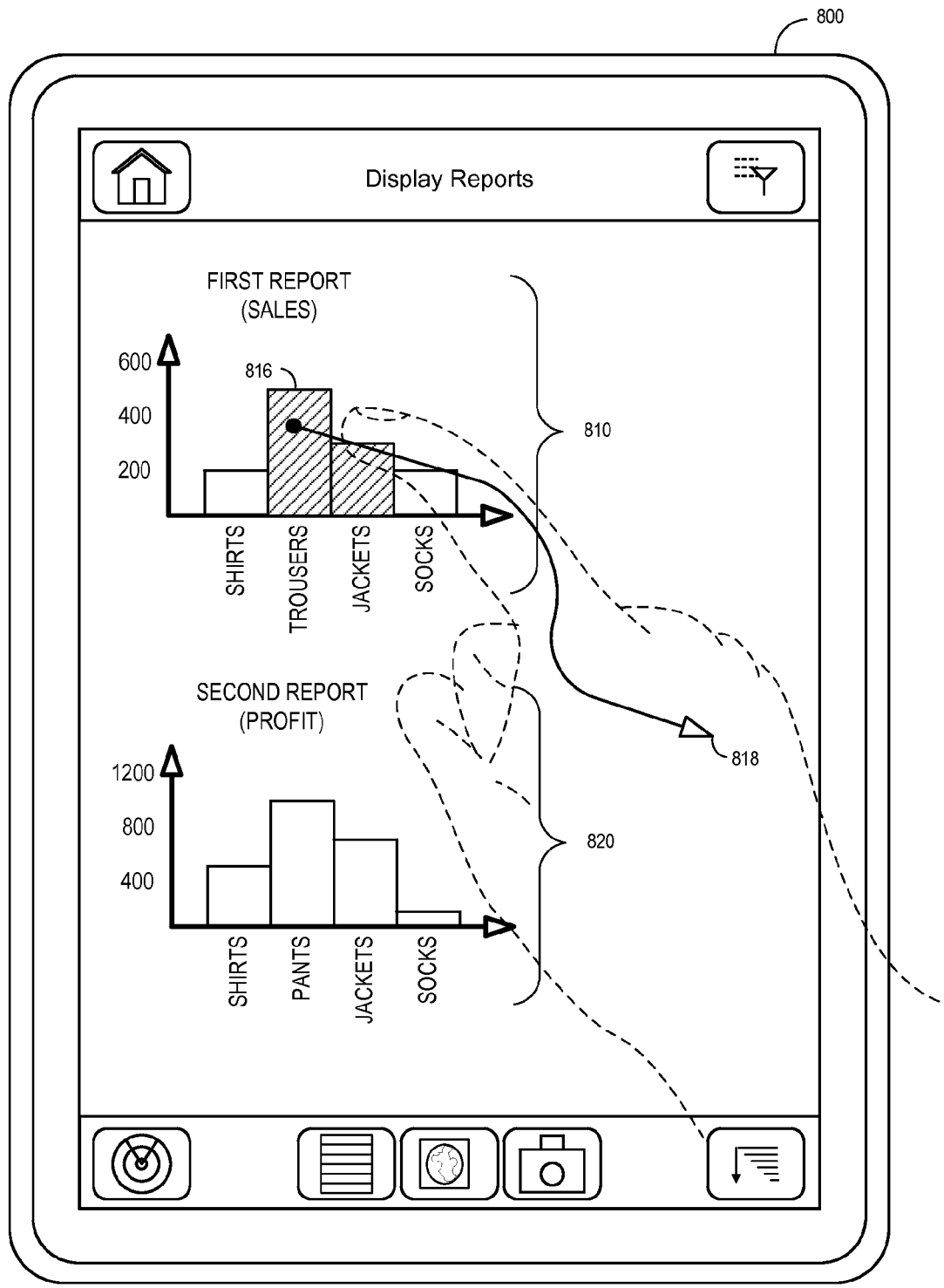
FIG. 8 is an illustration of a touchscreen display including selected elements of a first graphical report in accordance with some embodiments.

Although the examples described in connection with FIGS. 4 through 7 were associated with reports having a tabular form, note that embodiments might be associated with other types of reports. For example, the display 800 of FIG. 8 includes two bar-graph reports 810, 820 and a user has selected elements 816 of the first report 810 (e.g., as illustrated by bold in FIG. 8). In particular, the user has made both trousers and jackets selected elements 816.

The first report 810 may be associated with any set of appropriate data, such as business data retrieved by a business application and/or analytical engine. Further, the visual representation of the first report 810 can be any type of graph, chart, and/or table providing context and information regarding at least a subset of the first report. In some of the examples herein, the first report 810 is comprised of sales information for a business. Similarly the second report 820 may be associated with any set of appropriate data. In many instances, the second report 820 may be related to the first report 810, thereby providing a visualization of related data that can be viewed and analyzed by users to understand current, historical, and/or projected information associated with a particular business. The second 820 report may be in the same format as the first report 810, or alternatively, in a different format. For example, the visualization of the first report 810 may provide a bar chart illustrating sales information from a certain monthly range, while the visualization of the second report 820 may provide a pie chart illustrating profits associated with various products for a certain time range. Additionally, the first and second reports 810, 820 described herein may both be portions of the same underlying report, such that the first and second reports 810, 820 represent distinct subsets of a single report. In this case, the information in both visualizations may be related, such that a common semantic understanding of the first and second reports 810, 820 may be available and understandable by users.

The selection of the selected elements 816 of the first report might be performed through any appropriate manner. For example, a touch or multi-touch gesture may be applied to the visualization of the first report 810 (e.g., a double-tap) to select a certain subset of data. Alternatively, other input methods, such as the use of a mouse and/or hardware keyboard, may be used to define a subset of data for selection. Still further, one or more predefined filters or criteria may be selected from a list of available items displayed, for instance, on a portion of the display 800. By selecting one of these predefined filters or criteria, a certain portion (or subset) of the visualization of the first report might be selected.

Figure 9:
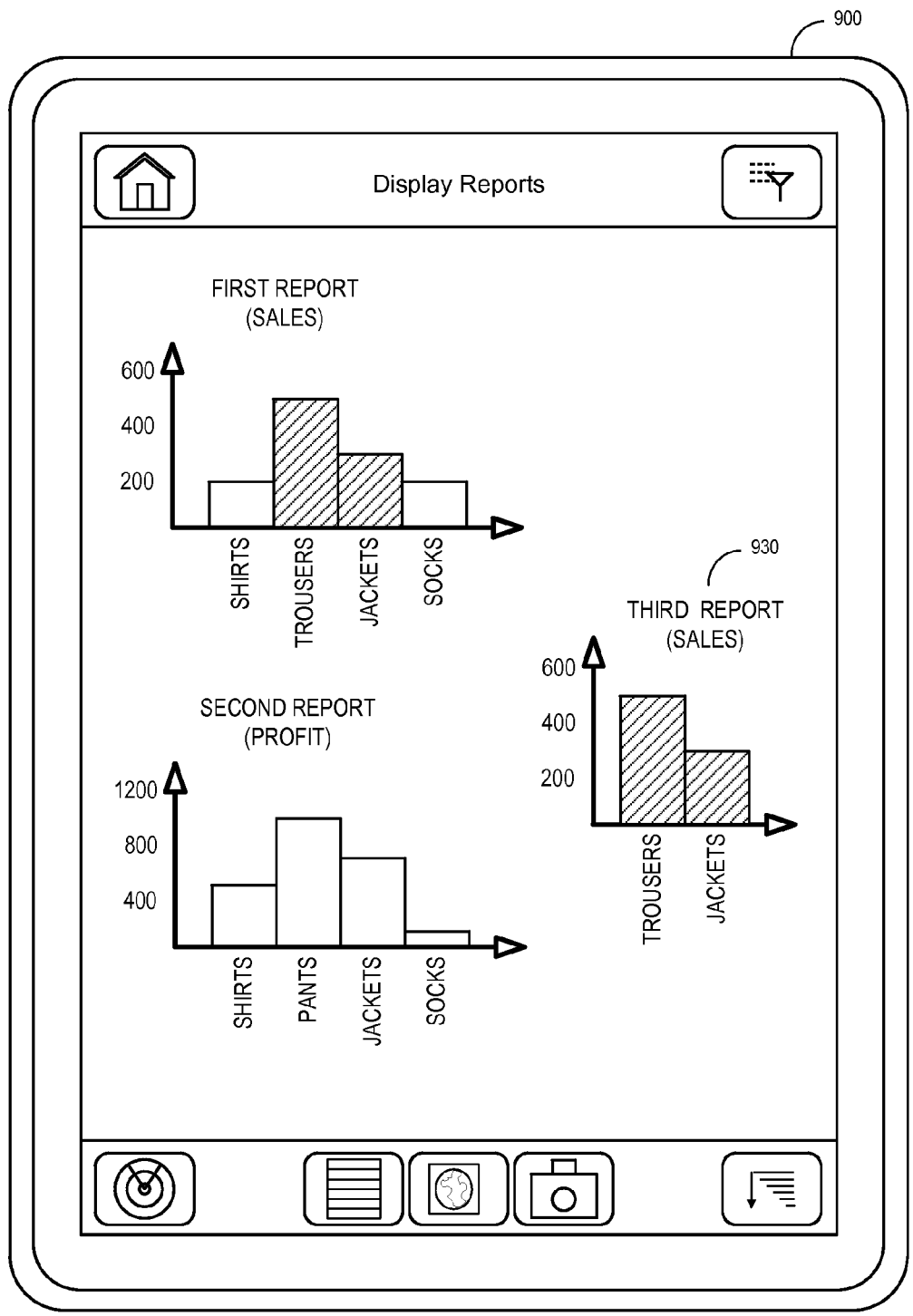
FIG. 9 is an illustration of a display after the action of FIG. 8 has been performed according to some embodiments.

The user might touch the selected elements 816, "drag" them to another area 818 of the display 400, and drop them by removing his or her finger. FIG. 9 is an illustration of a display 900 after the action of FIG. 8 has been performed according to some embodiments. As can be seen, the display includes a third report 930 (representing the selected element 816 of FIG. 8 created at the drop area 818). According to some embodiments, the third report 830 comprises a new instance of the first report. Note that the third report includes sales information for only the elements that had been selected in the first report ("trousers" and "jackets")

Figure 10:
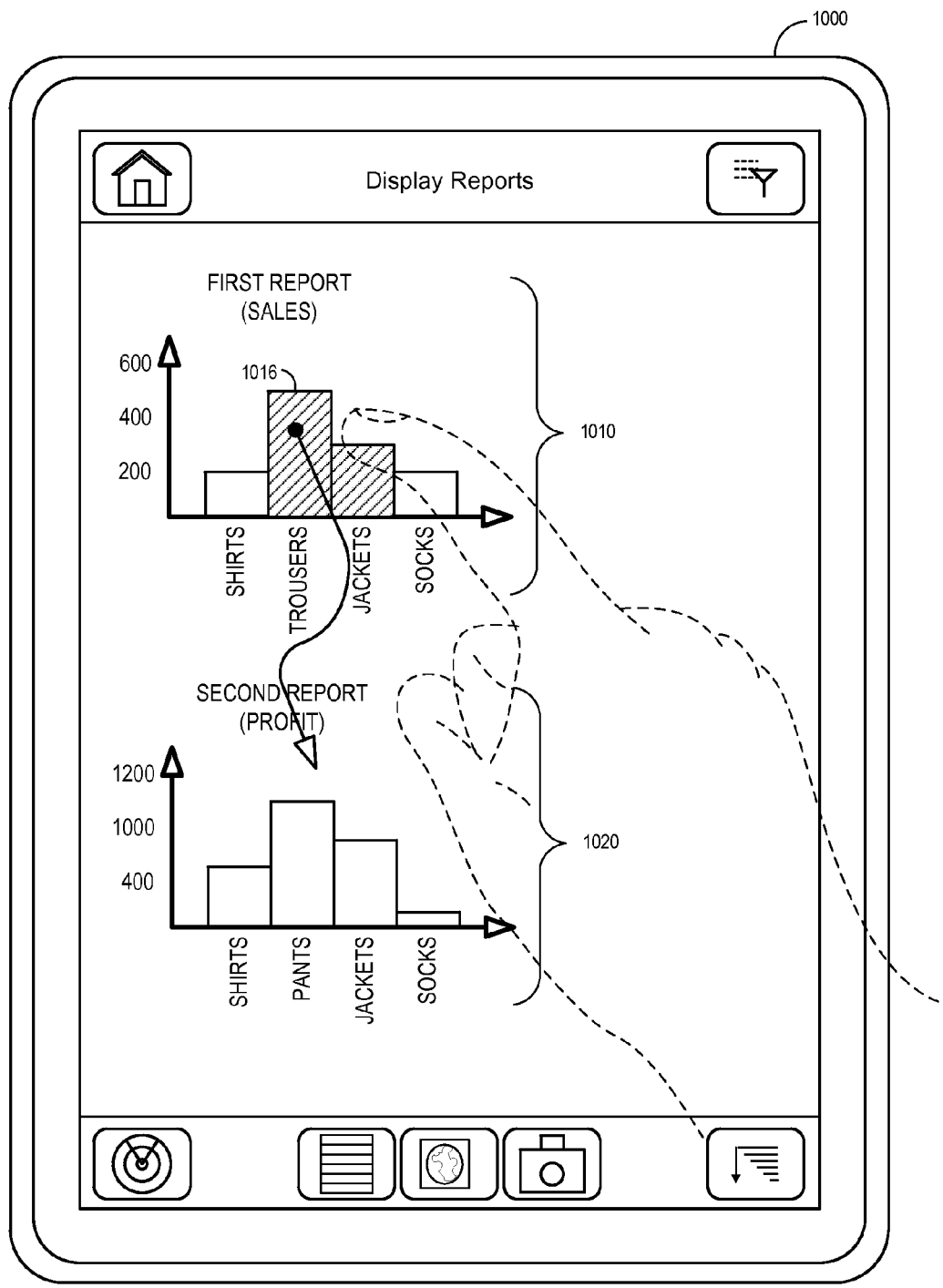
FIG. 10 is an illustration of a touchscreen display including selected elements of a first graphical report in accordance with another embodiment.
Figure 11:
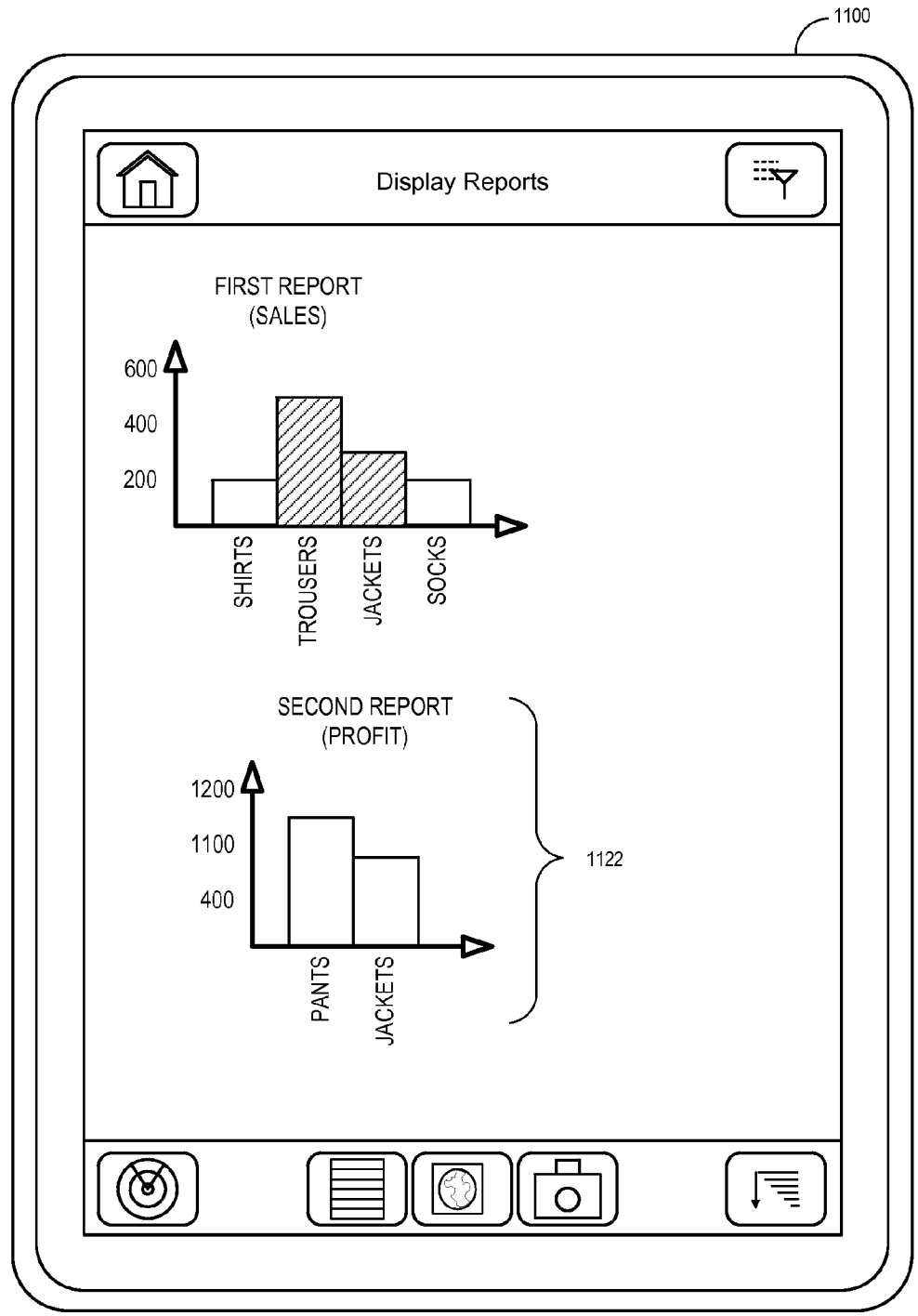
FIG. 11 is an illustration of a display after the action of FIG. 10 has been performed according to some embodiments.

Consider also the display 1000 of FIG. 10 where a user has also selected elements 1016 of a first report 1010 (e.g., as illustrated by bold in FIG. 10). In this case, the user might touch the selected elements 1016, "drag" them to another area of the display 1000 co-located with a second report 1020, and drop them by removing his or her finger. FIG. 11 is an illustration of a display 1100 after the action of FIG. 10 has been performed according to some embodiments. In this case, because both "trousers" and jackets were included as the selected elements 1016 that were dropped onto the second report 1020, a modified second report 1122 has been generated that includes profit information for "pants" and "jackets." That is, the analytic server either (i) found a pre-determined analytical mapping between the first and second reports or (ii) determined an appropriate mapping using meta-data (e.g., BO or MDAV information). Note that some selected elements might be handled with pre-determined mappings while other selected elements might need to be handled by resorting to meta-data. Thus, embodiments may provide an intuitive touchscreen interface may be provided in connection with business information report navigations.

Figure 12:
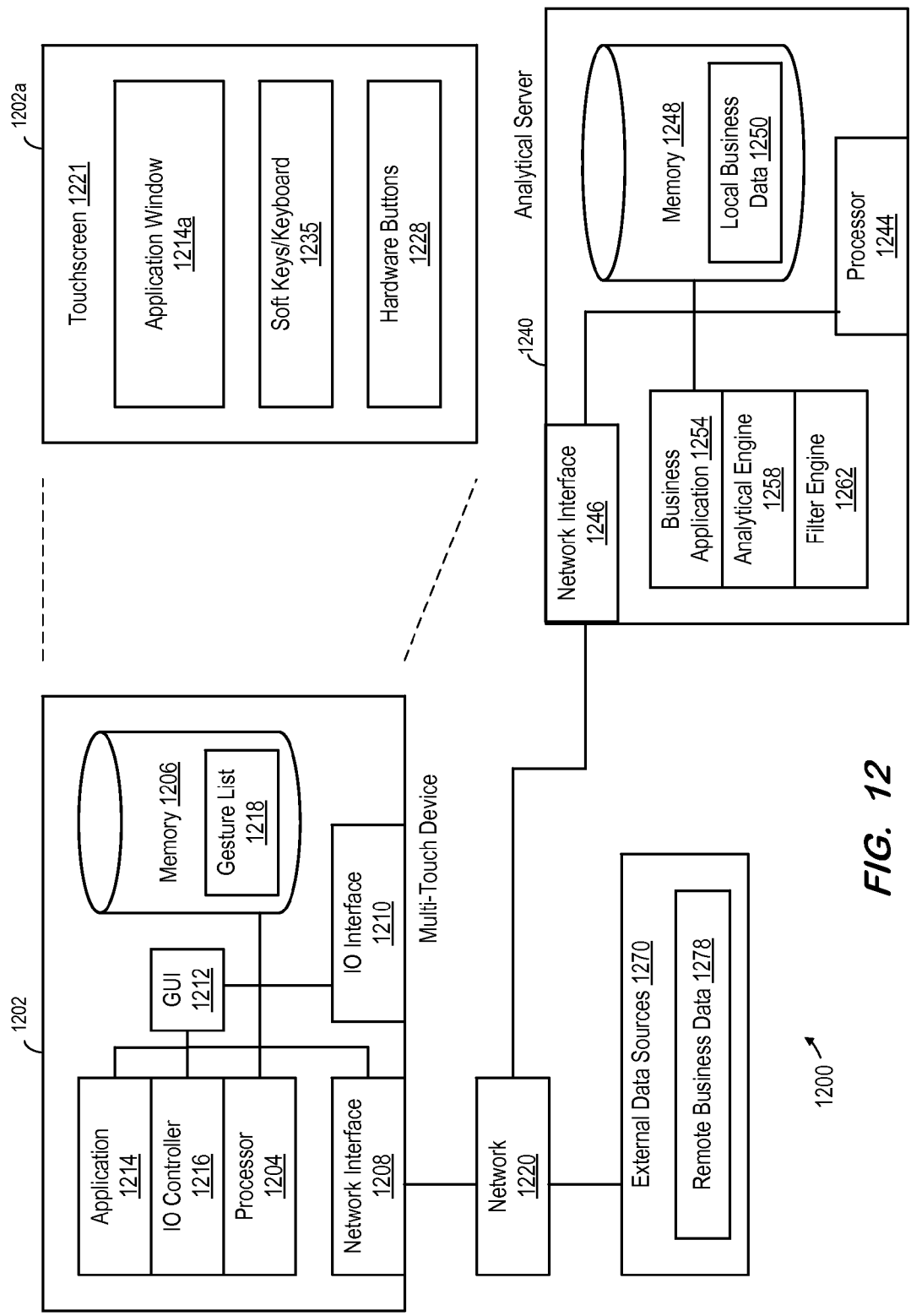
FIG. 12 illustrates an example environment for displaying, viewing, and/or manipulating analytical reports, including through the use of a touchscreen or multi-touch enabled device in accordance with one embodiment of the present disclosure.

Note that the actions described with respect to FIG. 3 may be performed by devices having any number of different configurations. FIG. 12 illustrates one example of an environment 1200 for displaying, viewing, and/or manipulating analytical reports, including through the use of a touchscreen or multi-touch enabled device in accordance with some embodiments.

As illustrated in FIG. 12, the environment 1200 includes a multi-touch device 1202, a network 1220, an analytical server 1240, and one or more external data sources 1270. In some instances, the multi-touch device 1202 and the analytical server 1240 may be combined as a single component in environment 1200, while in other instances, one or more of the illustrated parts of FIG. 12 may be separated into two or more additional components. In general, the multi-touch device 1202 and the analytical server 1240 can communicate across network 1220, where applicable. In general, environment 1200 depicts an example configuration of a system operable to visualize and manipulate various datasets of analytical data, business data, and/or any other suitable type of data.

In general, the multi-touch device 1202 can comprise any computer or other processing device that executes or displays information associated with one or more applications (such as an internal application 1214 or an external business application 1254), and that receives and processes input from touch-based gestures or other inputs, such as those from hardware-based inputs (e.g., a mouse or keyboard). In some instances, the multi-touch device 1202 is capable of receiving touch input based on multiple finger gestures simultaneously applied onto a touchscreen 1221 of the device 1202. Different types of multi-touch devices 1202 may be used in accordance with the present disclosure.

For example, different sized multi-touch devices 1202 may be used, as well as multi-touch devices 1202 where the touchscreen 1221 is in a separate housing or structure than the processing portions of the device 1202. Further, in alternative implementations, the multi-touch device 1202 may only accept and/or recognize input from non-touch-based input devices, such as a traditional mouse and keyboard configuration. In the current environment 1200, the multi-touch device 1202 is considered to be located in a single housing enclosing both the touchscreen 1221 and the various internal processors, memory, and other components of the multi-touch device 1202. In some instances, the touchscreen 1221 may be a Liquid Crystal Display ("LCD"). Further, the touchscreen 1221 may recognize touch-based inputs based on electrical conductivity, relative pressure from a touch-based input, the use of light-sensitive sensors to determine contact(s) with the touchscreen 1221, as well as any other suitable touch input mechanism or combination thereof. Some examples of multi-touch devices 1202 include Apple's iPhone smartphone and iPad tablet device, Google's Nexus One smartphone, HTC's Hero, Legend, and Desire smartphones, Microsoft's Zune HD media device, Palm's Pre smartphone, and Motorola's Droid smartphone, as well as numerous other consumer and/or business-related devices and accessories capable of receiving and processing multi-touch inputs.

In the implementation illustrated in FIG. 12, the multi-touch device 1202 includes a processor 1204, a memory 1206, a network interface 1208, an input-output interface 1210, an input-output controller 1216, an application 1214, and a graphical user interface (GUI) 1212. The network interface 1208 is used by the multi-touch device 1202 for communicating with other systems, computers, or devices within or external to environment 1200, such as through the multi-touch device's 1202 connection to the network 1220. Generally, the network interface 1208 comprises logic encoded in software and/or hardware in a suitable combination and operable to communicate with the network 1220. More specifically, the network interface 1208 may comprise software supporting one or more communication protocols associated with communications such that the network 1220 or hardware is operable to communicate physical signals within and outside the illustrated environment 1200.

Generally, the network 1220 facilitates wireless or wired communications between the components of the environment 1200 (e.g., between the multi-touch device 1202 and the analytical server 1240, between the analytical server 1240 and the plurality of external data sources 1270), as well as with any other local or remote computer, such as additional clients, servers, or other devices communicably coupled to network 1220 but not illustrated in FIG. 12. The network 1220 is illustrated as a single network in FIG. 12, but may be a continuous or discontinuous network without departing from the scope of this disclosure, so long as at least a portion of the network 1220 may facilitate communications between senders and recipients. The network 1220 may be all or a portion of an enterprise or secured network, while in another instance, at least a portion of the network 1220 may represent a connection to the Internet. In some instances, a portion of the network 1220 may be a Virtual Private Network ("VPN"), such as, for example, the connection between the multi-touch device 1202 and the analytical server 1240. Further, all or a portion of the network 1220 can comprise either a wired or wireless link. Example wireless links may include 802.11a/b/g/n, 802.20, WiMax, and/or any other appropriate wireless link. In other words, the network 1220 encompasses any internal or external network, networks, sub-network, or combination thereof operable to facilitate communications between various computing components inside and outside the illustrated environment 1200. The network 1220 may communicate, for example, Internet Protocol ("IP") packets, Frame Relay frames, Asynchronous Transfer Mode ("ATM") cells, voice, video, data, and other suitable information between network addresses. The network 1220 may also include one or more Local Area Networks ("LANs"), Radio Access Networks ("RANs"), Metropolitan Area Networks ("MANs"), Wide Area Networks ("WANs"), all or a portion of the Internet, and/or any other communication system or systems at one or more locations.

As illustrated in FIG. 12, the multi-touch device 1202 includes a processor 1204. Although illustrated as a single processor 1204 in FIG. 12, two or more processors may be used according to particular needs, desires, or particular embodiments of environment 1200. Each processor 1204 may be a Central Processing Unit ("CPU"), a blade, an Application Specific Integrated Circuit ("ASIC"), a Field-Programmable Gate Array ("FPGA"), or another suitable component, including processors specifically designed for mobile and/or multi-touch devices. Generally, the processor 1204 executes instructions and manipulates data to perform the operations of multi-touch device 1202, often using software. Specifically, the multi-touch device's processor 1204 executes the functionality required to execute the illustrated application 1214, interact with the business application 1254 (at analytical server 1240), interpret inputs to the multi-touch device 1202, including touch and multi-touch gestures received via the touchscreen 1221 (recognized and decoded by the Input Output (IO) interface 1210) using the IO controller 1216, as well as any other software functionality performed or available on the multi-touch device 1202. Regardless of the particular implementation, "software" may include computer-readable instructions, firmware, wired or programmed hardware, or any combination thereof on a tangible medium, as appropriate. Indeed, each software component may be fully or partially written or described in any appropriate computer language including C, C++, Java, Visual Basic, assembler, Perl, any suitable version of 4GL, as well as others, including languages and operating systems designed specifically for mobile and/or multi-touch devices. It will be understood that while portions of the software illustrated in FIG. 12 are shown as individual modules that implement the various features and functionality through various objects, methods, or other processes, the software may instead include a number of sub-modules, third-party services, components, libraries, and such, as appropriate. Conversely, the features and functionality of various components can be combined into single components, as appropriate.

As described, the processor 1204 executes one or more applications 1214, as well as the operations associated with the input-output controller 1216. The application 1214 may be any appropriate software, including, but not limited to, a web browser, a locally-executed business application, a general utility for the device 1202, word processing software, business utility software, or any other software suitable for use on the multi-touch device 1202. Further, the application 1214 may represent software associated with and/or working in conjunction with the business application 1254, at least a portion of which is executed remotely from the multi-touch device 1202. In some instances, the application 1214 may be a web browser operable to execute a web-based version of the business application 1254 through HyperText Transfer Protocol ("HTTP") requests and responses sent between the multi-touch device 1202 and the analytical server 1240.

The input-output controller 1216 may comprise software capable of interpreting one or more touch and/or multi-touch gestures received and identified by the IO interface 1210, where the IO interface 1210 is associated with the touchscreen 1221 of the device 1202. When specific touch inputs, such as touch- or multi-touch-based gestures, are received at the touchscreen 1221 and recognized or identified by the input-output interface 1210, those touch inputs are interpreted by the input-output controller 1216 to determine their meaning and function within a particular executing application 1214 or for use with an underlying operating system or functionality included with the multi-touch device 1202. For instance, a pinching gesture, performed by simultaneously contacting the touchscreen 1221 with two fingers and bringing them towards each other, may have different meanings and functionality in different instances and applications. In one instance, the pinch may cause a zoom (for instance, in a map or web browsing application), while in other instances, the pinch may change the granularity of a set of values presented on the screen. Alternatively, the pinch gesture may have a universal meaning independent of any particular application, such that a received and identified pinch gesture causes the some response by the input-output controller 1216 in any instance. As illustrated, the input-output controller 1216 can access a list, table, database, or any other set of information defining the set of recognized touch and multi-touch gestures, illustrated in FIG. 12 as the gesture list 1218 (and stored in memory 1206). The gesture list 1218 may comprise a list of cross-referencing information used by the input-output controller 1216 to determine the context-specific meaning of a particular gesture received and relayed by the input-output interface 1210 to the input-output controller 1216. In some instances, an application 1214 or other running software may include instructions that supersede the gesture meanings stored in the gesture list 1218, and which are used during the runtime of that particular application 1214 or software. Additionally, the gesture list 1218 may define a plurality of multi-touch and touch gestures defined by a touch-based or touch-related operating system, such that the various gestures provide building blocks upon which complicated and additional signals and commands can be based. By combining one or more gestures, or assigning gestures to a specific task, various commands and actions can be generated by software and user interface developers.

The memory 1206 within the multi-touch device 1202 may include any memory or database module and may take the form of volatile or non-volatile memory including, without limitation, magnetic media, optical media, Random Access Memory ("RAM"), Read Only Memory ("ROM"), removable media, or any other suitable local or remote memory component. Memory 1206 may store various objects or data, including classes, frameworks, applications, backup data, business objects, jobs, web pages, web page templates, gesture lists 1218 (as illustrated), database tables, repositories storing business or other dynamic information, or any other information including any parameters, variables, algorithms, instructions, rules, constraints, or references thereto relevant to the purposes or operations of the multi-touch device 1202. Additionally, memory 1206 may include any other appropriate data, such as VPN applications, firmware logs and policies, firewall policies, a security or access log, print or other reporting files, as well as others. In some instances, memory 1206 may store various types of analytical data and information for use in presenting and manipulating data as described in the present disclosure.

The multi-touch device 1202 further includes a Graphical User Interface ("GUI") 1212. In general, the GUI 1212 comprises a graphical user interface operable to allow the user to interact with at least a portion of environment 1200 for any suitable purpose, including generating or presenting a visual representation of the one or more web pages, documents, applications 1214, or any other suitable visual representation of data on the device 1202, as well as, through the use of the touchscreen 1221, provide or submit touch-based input to the multi-touch device 1202 and any of the software or processes executing on or through the device 1202. Generally, the GUI 1212 provides users with an efficient and user-friendly presentation of data provided by or communicated within the system. The term "graphical user interface," or GUI, may be used in the singular or in the plural to describe one or more graphical user interfaces and each of the displays of a particular graphical user interface. Therefore, the GUI 1212 can be any graphical user interface, such as a web browser, touchscreen, or Command Line Interface ("CLI") that processes information in the environment 1200 and efficiently presents the results to the user. In general, the GUI 1212 may include a plurality of User Interface ("UI") elements such as interactive fields, pull-down lists, and buttons operable by a user of the multi-touch device 1202. These UI elements may be related to the functions of the illustrated local application 1214 executing at the device 1202, as well as a remotely executed (at least in part) business application 1254, as well as the general functionality associated with the operating system or software environment executing on the device 1202. In particular, the GUI 1212 may be used in connection with a web browser, allowing users and the device 1202 to view and navigate to various web pages and/or web-based applications, some of which may be associated with (or provide a visual representation of) applications executed remotely from the multi-touch device 1202, such as business application 1254.

In some instances, the GUI 1212 is a software application that enables the multi-touch device 1202 (or a user thereof) to display and interact with text, images, videos, music and other information associated with local applications 1214 and/or business applications 1254 located remote from the device 1202, with the business applications 1254 sending a visual representation of data or functionality to the multi-touch device 1202 via network 1220. Additionally, other web-based applications (not shown in FIG. 12) can be accessed and interacted with via the GUI 1212. In some instances, at least a portion of the GUI 1212 may present information associated with a web browser, and can format web pages stored as HTML documents, XHTML documents, text files, or any other suitable files for display via the GUI 1212. The visual appearance of a particular web page may differ between different web browsers, based on the web browser's particular method of displaying information, as well as based on settings defined by or for the multi-touch device (or for a specific user thereof). Example web browsers may include Microsoft's Internet Explorer, Mozilla's Firefox, Apple's Safari, Opera Software ASA's Opera browser, and Google's Chrome, as well as any other suitable browser, including browsers designed specifically for mobile or portable devices, as well as for touch-based or multi-touch devices. In certain implementations, the web browser may be associated with, or may be a portion or module of, a business application 1254, such as web-based application, that provides and displays data and functionality associated with the application through web-based processing and on-device visualization of the same.

FIG. 12 further illustrates an example of the external design of the multi-touch device 1202a. As illustrated, the multi-touch device 1202a includes a touchscreen 1221 for displaying information and through which touch input is entered (described above), a set of permanent hardware buttons 1228, a set of soft keys or a software-based keyboard 1235, an application window 1214a displaying at least a portion of an executing application 1214 (or remotely executing business application 1254), such as one or more reports. Hardware buttons 1228 may be any buttons included with the multi-touch device 1202a, including a power button, a volume button, etc. The application window 1214a comprises at least a portion of the GUI 1212a used to display visual output and/or information associated with a particular executing operation or application. It will be understood that in some implementations, multiple instances of application windows 1214a associated with the same or different applications or operations may be presented simultaneously on the GUI 1212a. For instance, a first application window 1214a may be associated with an instance of the local application 1214, while a second application window 1214a may be associated with an instance of the remote business application 1254. Additionally, the multi-touch device 1202a may allow for application windows 1214a to be tiled, stacked, hidden, or otherwise moved and manipulated, for example, through specific touch and/or multi-touch gestures, as well as through manipulation of the hardware buttons 1228 or soft keys (or software-based keyboard) 1235.

The network 1220 can allow the multi-touch device 1202 to communicate with the analytical server 1240 and at least a portion of the functionality provided by the analytical server's business application 1254, analytical engine 1258, and filter engine 1262. At a high level, the analytical server 1240 comprises an electronic computing device operable to receive, transmit, process, store, or manage data and information associated with the environment 1200. In general, analytical server 1240 may be any computer or processing device such as, for example, a blade server, general-purpose PC, Macintosh, workstation, Unix-based computer, or any other suitable device. In other words, the present disclosure contemplates computers other than general purpose computers, as well as computers without conventional operating systems. Illustrated analytical server 1240 may be adapted to execute any operating system including Linux, UNIX, Windows Server, or any other suitable operating system. In some instances, such as that illustrated in FIG. 12, the analytical server 1240 hosts or executes a business application 1254 which can then be viewed or interacted with at the multi-touch device 1202 via the multi-touch device's GUI 1212. Input and interactions at the multi-touch device 1202 can be interpreted and relayed to the business application 1254 in accordance with the application's 1254 functionality. The business application 1254 can be any suitable application, including web- or cloud-based portions of a business application, such as an Enterprise Resource Planning ("ERP") system. In some instances, the business application 1254 may be a module or portion of a larger, enterprise and/or distributed application. For example, the business application 1254 illustrated in FIG. 12 may be a portion of a larger application, the business application 1254 providing functionality for retrieving, organizing, manipulating, and visualizing data associated with the underlying enterprise application.

The business application 1254 may be associated with an analytical engine 1258 that allows the business application 1254 to perform advanced operations on various sets of data. For instance, the analytical engine 1258 may be used to generate one or more reports, execute database queries, or perform other information retrieval operations as appropriate for the business application 1254. Information gathered or generated by the analytical engine 1258 may be passed to the business application 1254, or sent directly to one or more external devices, such as the illustrated multi-touch device 1202. Still further, the analytical server 1240 may also include a filter engine 1262 used to apply (or add) various types and levels of filtering criteria for the analytical engine 1258 when retrieving information. In some instances, the filter engine 1262 may receive or process input received from the multi-touch device 1202 to determine the filtering criteria associated with analytical data returned by the analytical engine 1258 (and the associated business application 1254). For instance, selections made by a user to portions of a chart provided in an application window 1214a can be sent to the filter engine 1262, and, upon receiving the appropriate instructions from the user (e.g., by dragging and dropping a selected set of information), apply the filtering criteria to a dataset. In some instances, one or both of the analytical engine 1258 and the filter engine 1262 may be included with or a part of the business application 1254. Alternatively, the filter engine 1262 may be included within or a part of the analytical engine 1258, allowing for various filters to be applied when datasets are retrieved, generated, and/or presented.

As illustrated in FIG. 12, the analytical server 1240 includes a network interface 1246, a processor 1244, and a memory 1248. The network interface 1246 may be similar to the network interface 1208 of the multi-touch device 1202, and as such, may allow the analytical server 1240 to communicate with the multi-touch device 1202, as well as any other device, server, or other component communicably coupled to the network 1220. The processor 1244 may comprise more than one processor, and may be a CPU, a blade, an ASIC, a FPGA, or another suitable component. Generally, the processor 1244 executes instructions and manipulates data to perform the operations of the analytical server 1240, often using software, and may execute the business application 1254, the analytical engine 1258, and the filter engine 1262.

Similar to memory 1206 of the multi-touch device 1202, memory 1248 may include any memory or database module and may take the form of volatile or non-volatile memory including, without limitation, magnetic media, optical media, RAM, ROM, removable media, or any other suitable local or remote memory component. The memory 1248 may store various objects or data, including business data, database tables, repositories storing business information, classes, frameworks, applications, backup data, business objects, jobs, web pages, web page templates, or any other information including any parameters, variables, algorithms, instructions, rules, constraints, or references thereto. Additionally, memory 1248 may include any other appropriate data, such as VPN applications, firmware logs and policies, firewall policies, a security or access log, print or other reporting files, as well as others. In some instances, memory 1248 may store various types of analytical data and information for use in presenting and manipulating data as described in the present disclosure, such as local business data 1250. The local business data 1250 may in some instances include portions of the data associated with the business application 1254, such as information on a particular business (e.g., sales, revenues, inventory, etc.), pre-determined analytic mappings, and metadata as well as any datasets relevant. In some instances, however, the entire set of business data 1250 for a particular business or business application 1254 may be distributed across a plurality of locations. As illustrated in FIG. 12, one or more external data sources 1270 (e.g., external servers, data repositories, or other devices or components storing or associated with additional data and/or datasets) may also be available, and can be accessed by the business application 1254 and the analytical engine 1258 in order to read, view, and manipulate additional and remote business data 1278. Still further, the business application 1254 may use data stored at the multi-touch device 1202, as well as any other device or location associated with network 1220 to which the business application 1254 has rights and can access said data.

In this way, the environment 1200 of FIG. 12 may facilitate the execution of any of the embodiments described herein. For example, the processor 1244 may generate: (i) a first report associated with at least some of the business information, wherein the first report is to be displayed in a first area of a display of a remote touch sensitive device, and (ii) a second report associated with at least some of the business information, wherein the second report is to be displayed in a second area of the touch sensitive device. Moreover, the network interface 1246 may receive a destination location from the multi-touch device 1202, wherein the destination location is associated with a movement of a selected report element of the first report. According to some embodiments, the processor 1244 may, if the destination location is not associated with a report, generate a third report based on at least some of the business information and the selected report element. If the destination location is associated with the second report, the processor 1244 may generate a modified second report based on a pre-determined analytical mapping between the first and second reports, if available.

While FIG. 12 is described as containing or being associated with a plurality of components, not all components illustrated within the illustrated implementation of FIG. 12 may be utilized in each alternative implementation of the present disclosure. Additionally, one or more of the components described herein may be located external to environment 1200, while in other instances, certain components may be included within or as a portion of one or more of the other described components, as well as other components not described. Further, certain components illustrated in FIG. 12 may be combined with other components, as well as used for alternative or additional purposes, in addition to those purposes described herein.

The foregoing diagrams represent logical architectures for describing processes according to some embodiments, and actual implementations may include more or different components arranged in other manners. Moreover, each system described herein may be implemented by any number of devices in communication via any number of other public and/or private networks. Two or more devices of may be located remote from one another and may communicate with one another via any known manner of network(s) and/or a dedicated connection. Moreover, each device may comprise any number of hardware and/or software elements suitable to provide the functions described herein as well as any other functions. Other topologies may be used in conjunction with other embodiments.

Embodiments described herein are solely for the purpose of illustration. Those in the art will recognize other embodiments may be practiced with modifications and alterations to that described above.

What is claimed is:

1. An apparatus comprising:
   a database storing business information and meta-data associated with the business information;
   a processor coupled to the database and configured to generate: (i) a first report associated with at least one of some of the business information and meta-data, wherein the first report is to be displayed in a first area of a display of a remote touch sensitive device, and (ii) a second report associated with at least one of some of the business information and meta-data, wherein the second report is to be displayed in a second area of the touch sensitive device; and
   a communication port coupled to the processor and configured to transmit the first and second reports and to receive, from the touch sensitive device, location coordinates identifying a drop area location on the display, wherein the drop area location coordinates represent a drop location of a user's drag and drop operation of a report element selected by the user from the first report on the touch sensitive device display;
   wherein the processor is further configured to:
      if the drop area location coordinates of the user-selected report element are not co-located on the touch sensitive device display with a report location, generate a third report for display on the touch sensitive device display at the drop area location coordinates based on at least one of some of the business information and meta-data, and the selected report element, and
      if the drop area location coordinates of the user-selected report element are co-located on the touch sensitive device display with a location of the second report, generate a modified second report for display on the touch sensitive device display at the location of the second report based on a pre-determined analytical mapping between the first and second reports, if available.

2. The apparatus of claim 1, wherein the processor is further to, if no pre-determining analytical mapping is available between the first and second reports, generate the modified second report based on meta-data associated with the selected report element.

3. The apparatus of claim 2, wherein the meta-data used to generate the modified second report is associated with at least one of: (i) a business object, or (ii) multi-dimensional analytic view information.

4. The apparatus of claim 1, wherein the pre-determined analytical mapping includes navigations from a source report to a target report.

5. The apparatus of claim 1, wherein the third report comprises a new instance of the first report.

6. The apparatus of claim 5, wherein filtering parameters associated with the first report are automatically applied to the third report.

7. The apparatus of claim 1, wherein the processor is associated with an advanced business application programming back-end server.

8. The apparatus of claim 1, wherein the first report comprises at least one of: (i) a table containing business information, or (ii) a graphical representation of business information.

9. A non-transitory computer-readable medium having program instructions stored thereon, the program instructions executable by a processor to cause an apparatus to:
   generate a first report based on at least one of some business information and meta-data stored in a database;
   transmit data associated with the first report to a remote touch sensitive device having a display;
   receive, from the touch sensitive device, location coordinates identifying a drop area location on the display, wherein the drop area location coordinates represent a drop location of a user's drag and drop operation of a report element selected by the user from the first report on the touch sensitive device display; and if the drop area location coordinates of the user-selected report element are not co-located on the touch sensitive device display with any report location, generate a new report for display on the touch sensitive device display at the drop area location coordinates based on at least one of some of the business information and meta-data, and the selected report element, and if the drop area location coordinates of the user-selected report element are co-located on the touch sensitive device display with a location of a report other than the first report, generate a modified other report for display on the touch sensitive device display at the location of the co-located report based on a pre-determined analytical mapping between the first report and the other report, if available.

10. The medium of claim 9, wherein the processor is further to, if no pre-determining analytical mapping is available between the first report and the other report, generate the modified other report based on meta-data associated with the selected report element.

11. The medium of claim 10, wherein the meta-data used to generate the modified other report is associated with at least one of: (i) a business object, or (ii) multi-dimensional analytic view information.

12. The medium of claim 9, wherein the pre-determined analytical mapping includes navigations from a source report to a target report.

13. The medium of claim 9, wherein the new report comprises a new instance of the first report.

14. The medium of claim 13, wherein filtering parameters associated with the first report are automatically applied to the new report.

15. The medium of claim 9, wherein the processor is associated with an advanced business application programming back-end server, and the first report comprises at least one of: (i) a table containing business information, or (ii) a graphical representation of business information.

16. A method comprising:
generating a first report based on business information stored in a database;
transmitting data associated with the first report to a remote touch sensitive device having a display;
receiving, from the touch sensitive device, location coordinates identifying a drop area location on the display, wherein the drop area location coordinates represent a drop location of a user's drag and drop operation of a report element selected by the user from the first report on the touch sensitive device display; and
if the drop area location coordinates of the user-selected report element are not co-located on the touch sensitive device display with any report location, generate a new report for display on the touch sensitive device display at the drop area location coordinates based on at least one of some of the business information and meta-data, and the selected report element, and
if the drop area location coordinates of the user-selected report element are co-located on the touch sensitive device display with a location of a report other than the first report, generate a modified other report for display on the touch sensitive device display at the location of the co-located report based on a pre-determined analytical mapping between the first report and the other report, if available.

17. The method of claim 16, wherein the processor is further to, if no pre-determining analytical mapping is available between the first report and the other report, generate the modified other report based on meta-data associated with the selected report element.

18. The method of claim 17, wherein the meta-data used to generate the modified other report is associated with at least one of: (i) a business object, or (ii) multi-dimensional analytic view information.

* * * * *